Patented May 30, 1944

2,349,912

UNITED STATES PATENT OFFICE 2,349,912

HALOGEN METHYL COMPOUNDS OF SULPHONAMIDES AND SULPHONHYDRAZIDES AND A PROCESS OF PREPARING THEM

Ludwig Orthner, Gerhard Balle, and Heinz Schild, Frankfort-on-the-Main, Germany, assignors, by mesne assignments, to General Aniline & Film Corporation, New York, N. Y., a corporation of Delaware No Drawing. Application December 23, 1938, Serial No. 247,394. In Germany December 24, 1937

8 Claims. (Cl. 260—556)

The present invention relates to halogen methyl compounds of sulphonamides and sulphonhydrazides and to a process of preparing them.

We have found that halogen methyl compounds of sulphonamides and sulphonhydrazides can be prepared by causing sulphonamides or sulphonhydrazides which have at least one exchangeable hydrogen atom at the amide-nitrogen and which also contain a hydrocarbon radical having at least 4 carbon atoms which may contain substituents and/or be interrupted by at least one hetero-atom or hetero-atom group, to react with formaldehyde and hydrogen halide at ordinary or raised temperature, if desired, in the presence of a solvent or a diluent.

The compounds obtainable according to the present invention may also be made by preparing the methylol compounds of the above defined sulphonamides or sulphonhydrazides and causing them to react in an analogous manner with hydrogen halide.

The sulphonamides and sulphonhydrazides which may be used in the invention and which contain one of the groups

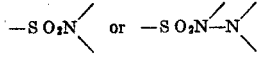

may be of various constitution provided that they correspond with the above-mentioned conditions. They may be compounds of the aliphatic series or may belong to the compounds of cyclic constitution. As examples there may be mentioned: butylsulphonamide, isohexylsulphonmethylamide, methylsulphonbutylamide, dodecylsulphonamide, octadecylsulphonamide, 12-chloro-octadecylsulphonamide, 9.10-dichloroctadecylsulphonmethylamide, dodecylsulpho-N-acetylamide, para-butylphenoxyethylsulphon-N-caprylamide, toluenesulphonamide, para-butylbenzenesulphonamide, naphthalenedisulphonamide, para-butylphenylbutylsulphonamide, para-butylcyclohexylethylsulphonamide, naphthenesulphonamide and the corresponding hydrazides.

In many cases the manufacture of the halogenmethyl compounds is operated by dissolving or suspending the sulphonamides in aqueous formaldehyde and by introducing hydrogen halide into the aqueous solution at ordinary or moderately raised temperature until the whole is saturated with hydrogen halide. In other cases it may be advantageous to use an organic solvent; the sulphonamide is dissolved in an organic solvent such as benzene, toluene, xylene, methylenechloride, carbon tetrachloride, chlorobenzene, ether, solid formaldehyde is added to the solution and hydrogen halide is introduced into the mixture at ordinary or raised temperature, while stirring. When the solution is saturated with hydrogen halide, the reaction is generally finished. The halogen methyl compound either separates in solid form from the solvent, or the solvent is separated in known manner after the water formed during the reaction has been removed. If the sulphonamide contains two exchangeable hydrogen atoms, it is possible to replace both hydrogen atoms by a halogen methyl group by using an excess of formaldehyde.

A modification of the process consists in preparing a methylol compound of the sulphonamide or sulphonhydrazide of the above defined kind and causing it to react with hydrogen halide. The sulphomethylolamide is prepared by causing formaldehyde to react with the sulphonamide or sulphonhydrazide in the presence of an alkaline agent, either in aqueous solution or in the presence of an alcohol of low molecular weight as solvent which depends upon the solubility of the sulphonamide or the sulphonhydrazide in question.

The new halogenmethyl compounds which are for the greater part of a solid or of an oily to wax-like consistency, are distinguished by a very great reactivity. They are decomposed by high temperature or by the action of alkalies or acids. According to their properties they may be used for the treatment of materials, especially of textiles, leather, paper, plastic masses or the like.

The following examples serve to illustrate the invention but they are not intended to limit it thereto; the parts are by weight:

(1) 50 parts of octadecylsulphonamide are dissolved in 300 parts of methylene chloride and 5 parts of para-formaldehyde are then added. At 0° C. to 5° C. hydrochloric acid gas is introduced in a slow current and after saturation has been attained, the introduction of the hydrochloride gas is continued for some time, while stirring. The insoluble part is then filtered, the solution is dried with sodium sulfate and the solvent is expelled, at 40° C. to 45° C., in order to preserve the reaction product. The mono-chloromethylamide is obtained in the form of a solid mass.

The octadecylsulphonamide can be obtained by known methods by causing liquid NH₃ to act upon octadecylsulphochloride which has been prepared according to the prescriptions of Sprague and Johnson (Journ. Am. Soc. 59, page 2439).

(2) 50 parts of octadecylsulphonamide are dissolved in 300 parts of methylene chloride. 15 parts of paraformaldehyde are then added and the whole is worked up as indicated in Example 1. The product obtained is mainly dichloromethylamide.

(3) 179 parts of isohexylsulphonmethylamide are dissolved in 600 parts of carbon tetrachloride and 35 parts of para-formaldehyde are added. The reaction is performed by introducing hydrochloric acid gas into the solution and the reaction mixture is worked up as indicated in Example 1. The methylchloromethylamide obtained is a semi-solid mass.

The isohexylsulphonmethylamide is obtained in the following manner: isohexylchloride prepared from the isohexylalcohol obtained as a by-product in the synthesis of methanol, is condensed with thiourea and converted into the sulphochloride according to the methods of Sprague and Johnson (Journ. Am. Soc. 59, page 2439). By causing the sulphochloride thus obtained to react with liquid monomethylamine the isohexylsulphomethylamide is obtained.

(4) 36 parts of octydecylsulphomethylolamide are suspended in 300 parts of methylene chloride and hydrochloric acid gas is introduced at 15° C. to 20° C. until the substance has dissolved and hydrochloric acid escapes. The solution is then dried by means of sodium sulphate and the methylene chloride is expelled. The chloromethyl compound is obtained in the form of a solid mass.

(5) A fraction of hydrocarbons obtained in the hydrogenation of carbonmonoxide according to Fischer-Tropsch and having a chain length of about 14 C-atoms is converted into the sulphochloride by the simultaneous action of sulphurdioxide and chlorine with exposure to ultra-violet light. From the sulphochloride a tetradecylsulphonamide is obtained by known methods, for instance by the action of liquid NH₃. 30 parts of the sulphonamide thus obtained are introduced into 250 parts of methylenechloride and the mixture is treated at room temperature with 6 parts of para-formaldehyde and hydrochloric acid gas until the sulphonamide has dissolved. The solution is dried by means of calcium chloride and the solvent is then distilled under reduced pressure at 30° C. The chloromethyl compound is obtained as a brown oil which decomposes on heating with liberation of formaldehyde and hydrochloric acid.

By using as parent material hard paraffin instead of the above-named fraction of hydrocarbons a wax-like product is obtained having properties similar to those of the above product.

(6) 30 parts of tetradecylsulphonamide (obtained in the manner described in Example 5) are mixed with 30 parts of an aqueous formaldehyde solution of about 40 per cent strength. Hydrochloric acid gas is then introduced into the mixture at room temperature until it is saturated. After stirring for 12 hours the aqueous layer is separated. The same compound is obtained as that described in Example 5.

(7) 38 parts of n-propyl-N-octadecylsulphonamide, obtained by the reaction of n-propylsulphochloride with octadecylamine are suspended in a mixture of 150 parts of benzene and 4 parts of para-formaldehyde. Hydrochloric acid gas is introduced into this suspension at room temperature, while stirring, until the sulphonamide has dissolved. After the solution has been dried by means of sodium sulphate the solvent is distilled. The chloromethyl compound of the n-propyl-N-octadecylsulphonamide is obtained in the form of a wax-like mass.

(8) 37 parts of para-toluene-hydroxymethylsulphonamide (prepared, for instance, according to the process described in German Patent 403,718) are suspended in 100 grams of chlorobenzene and hydrochloric acid gas is introduced into this suspension at ordinary temperature until the sulphamide has dissolved. After drying by means of calcium chloride and distilling the chlorobenzene under reduced pressure the desired chloromethyl compound remains in the form of a viscous mass. A chloromethyl compound similar in appearance is obtained from para-toluenesulphon-n-dodecylamide of the following formula:

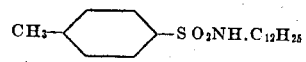

(9) By acylating 1-amino-2-nitro-4-benzenesulphonamide with stearic acid chloride according to known methods there is obtained the 1-stearylamino-2-nitro-4-benzene-sulphonamide of the formula:

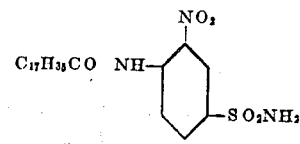

24 parts of this compound are caused to react at 30° C. in 150 parts of methylene chloride with 3 parts of para-formaldehyde while introducing hydrochloric acid gas. The solution is dried by means of calcium chloride and the solvent is distilled. A yellow viscous mass remains.

(10) 12 parts of 1-methoxy-2-nitro-4-benzenesulphonamide are suspended in 170 parts of methylene chloride and 3 parts of para-formaldehyde are added to the suspension. The suspension is then saturated at room temperature with hydrochloric acid gas. The solution is dried with calcium chloride and the solvent is distilled. A yellowish-white viscous mass remains.

(11) Para - isododecylcyclohexanole is condensed according to the Schotten-Baumann method with sodium chlorethane-sulphonate. By reaction with phosphorus pentachloride there is obtained the sulphochloride which by subsequent treatment with liquid ammonia yields a compound of the following formula:

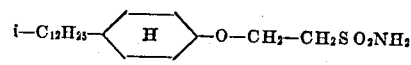

38 parts of this compound are dissolved or suspended in 200 parts of ether and 4 gram of para-formaldehyde are added. Hydrochloric acid gas is introduced into the mixture at room temperature until it is saturated. The solution obtained is dried over calcium chloride and the ether is distilled. A lard-like mass remains.

We claim:

1. The process which comprises reacting upon a compound of the general formula

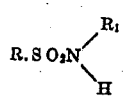

wherein R stands for an aliphatic hydrocarbon radical of at least 4 carbon atoms and R₁ stands for a member of the group consisting of hydrogen and alkyl radicals, with formaldehyde and hydrochloric acid, in the presence of a liquid medium of the group consisting of water and organic solvents.

2. A chloromethyl compound of the general formula

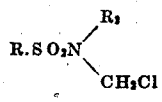

wherein R stands for an aliphatic hydrocarbon radical of at least 4 carbon atoms and $R_2$ stands for a member of the group consisting of hydrogen and alkyl radicals.

3. As new compounds sulphonamides having at least 4 carbon atoms selected from the group consisting of alphatic sulphonamides and aliphatic sulphonamides being substituted in the carbon chain by carbocyclic radicals, substituted at the amide-nitrogen by at least one monohalogen methyl group.

4. As new compounds sulphonamides having at least 4 carbon atoms selected from the group consisting of aliphatic sulphonamides and aliphatic sulphonamides being substituted in the carbon chain by carbocyclic radicals substituted in the amide-nitrogen by at least one monochloro-methyl group.

5. Chloromethylene sulphonamides of the formula $R-SO_2-NH-CH_2Cl$ wherein R is an alkyl radical of at least 8 carbon atoms.

6. Process for the production of chloromethylene sulphonamides of the formula $$R-SO_2-NH-CH_2Cl$$

wherein R is an alkyl radical of at least 8 carbon atoms, which comprises reacting an alkyl sulphonamide of the formula $R-SO_2-NH_2$ with formaldehyde and hydrogen chloride.

7. The chloromethylene octadecyl sulphonamide.

8. Chloromethylene isohexylsulphonmethylamide.

LUDWIG ORTHNER.
GERHARD BALLE.
HEINZ SCHILD.